US010330538B2

(12) United States Patent
Rud et al.

(10) Patent No.: US 10,330,538 B2
(45) Date of Patent: Jun. 25, 2019

(54) THERMOCOUPLE TEMPERATURE SENSOR WITH COLD JUNCTION COMPENSATION (71) Applicant: Rosemount Inc., Shakopee, MN (US)

(72) Inventors: Jason Harold Rud, Mayer, MN (US); Allen John Kassen, St. Louis Park, MN (US); Clarence Holmstadt, Chaska, MN (US)

(73) Assignee: ROSEMOUNT INC., Shakopee, MN (US)

( * ) Notice: Subject to any disclaimer, the term of this patent is extended or adjusted under 35 U.S.C. 154(b) by 137 days.

(21) Appl. No.: 15/437,706

(22) Filed: Feb. 21, 2017

(65) Prior Publication Data
US 2018/0238743 A1 Aug. 23, 2018

(51) Int. Cl.
G01K 7/13 (2006.01)
G01K 7/16 (2006.01)

(52) U.S. Cl.
CPC ............... *G01K 7/13* (2013.01); *G01K 7/16* (2013.01)

(58) Field of Classification Search
CPC ..................................................... G01K 7/12
See application file for complete search history.

(56) References Cited

U.S. PATENT DOCUMENTS

| 6,068,400 | A | * | 5/2000 | Nelson | G01K 7/12 374/179 |
| 6,356,191 | B1 | | 3/2002 | Kirkpatrick et al. | |
| 7,044,638 | B2 | * | 5/2006 | Phillips | G01K 7/04 374/180 |

(Continued)

FOREIGN PATENT DOCUMENTS

| CN | 1081251 | | 1/1994 |
| JP | 06186089 A | * | 7/1994 |
| WO | WO 2015/026898 | | 2/2015 |

OTHER PUBLICATIONS

"Remote CJC Block", Installation Instructions, Part No. HA030188, Issue 1.0, Aug. 2009, 4 pgs.

(Continued)

*Primary Examiner* — Clayton E. LaBalle
*Assistant Examiner* — Leon W Rhodes, Jr.
(74) *Attorney, Agent, or Firm* — Westman, Champlin & Koehler, P.A.

(57) ABSTRACT

A thermocouple temperature sensor has a thermocouple with first and second conductors connected at a junction and a resistance temperature device with first and second conductors. The first conductor of the resistance temperature device is connected to the first conductor of the thermocouple. A first external conductor is connected to the second conductor of the thermocouple, wherein the first external conductor is configured as a voltage sense conductor for the resistance temperature device and a voltage sense conductor for the thermocouple. A second external conductor is connected to the first conductors of the thermocouple and the resistance temperature device, wherein the second external conductor is configured as a current conductor for the resistance temperature device and a voltage sense conductor for the thermocouple. A third external conductor is connected to the second conductor of the resistance temperature device and is configured as a current conductor for the resistance temperature device.

19 Claims, 4 Drawing Sheets (56) References Cited

U.S. PATENT DOCUMENTS

| | | | | |
|---|---|---|---|---|
| 7,447,607 B2* | 11/2008 | Schuh | ...................... | G01K 7/42 |
| | | | | 374/E15.001 |
| 9,470,580 B2 | 10/2016 | Rud | | |
| 10,006,815 B2* | 6/2018 | Hedayat | ................... | G01K 7/12 |

OTHER PUBLICATIONS

Notification of Transmittal of the International Search Report and the Written Opinion of the International Searching Authority from PCT/US2018/017929, dated Apr. 11, 2018.

Office Action from Chinese Patent Application No. 201720623018.6, dated Feb. 27, 2018.

\* cited by examiner

THERMOCOUPLE TEMPERATURE SENSOR WITH COLD JUNCTION COMPENSATION

BACKGROUND

The process industry employs process variable transmitters to monitor process variables associated with substances such as solids, slurries, liquids, vapors, and gasses in chemical, pulp, petroleum, pharmaceutical, food and other processing plants. A process temperature transmitter provides an output related to a sensed process temperature. The temperature transmitter output can be communicated over a process control loop to a control room, or the output can be communicated to another process device such that the process can be monitored and controlled.

In some applications, the temperature transmitter is mounted directly to the temperature sensor assembly containing the temperature sensor. In other applications, the temperature transmitter is mounted remotely from the temperature sensor assembly to protect the electronics of the transmitter from the environment surrounding the temperature sensor.

One type of temperature sensor is a thermocouple, which includes two conductors formed of different materials and connected at a junction referred to as the "hot" junction. Due to the Seebeck Effect, a voltage develops across the free ends of the conductors when a temperature gradient exists between the free ends and the hot junction.

The amount of voltage between the free ends of the thermocouple conductors is a function of the temperature differential between the free ends and the hot junction. As a result, the voltage between the free ends can be used to determine the temperature at the hot junction if the temperature at the free ends is known. The temperature at the free ends is referred to as the reference temperature.

Under the prior art, the free ends of the thermocouple conductors extend into the temperature transmitter where the voltage between the free ends is measured. A temperature sensor within the transmitter provides the reference temperature of the free ends. Using this reference temperature and the measured voltage, the temperature transmitter calculates the temperature at the hot junction. This construction, in which the thermocouple conductors extend all the way to the interior of the temperature transmitter, is used for both directly mounted transmitters and remotely mounted transmitters.

A second type of temperature sensor is a resistance temperature device (RTD). RTD sensors utilize the fact that the resistance of a conductor changes based on the temperature of the conductor. By measuring the resistance of the RTD, it is possible to look up the corresponding temperature associated with that resistance level. To measure the resistance, a current is passed through the RTD and a voltage across the RTD is measured.

There are two-wire, three-wire, and four-wire implementations of RTD sensors. In the two-wire implementation, one wire is connected to one end of the RTD and a second wire is connected to the other end of the RTD. Current is passed through the two wires by a current source or a voltage is applied across the two wires by a voltage source and the resulting voltage/current is measured. The resulting combination of current and voltage is then used to determine the resistance of the RTD. Such two-wire implementations are prone to error, however, because the wires leading to the RTD sensor have inherent resistances that affect the measured current/voltage near the voltage/current source.

To remove this parasitic resistance from the measurements, three-wire implementations use a bridge circuit that applies a current to the RTD using two of the three wires and senses a voltage on one end of the RTD using a third sense wire that does not have current passing through it. The bridge circuit is designed to counteract the parasitic resistances in the two current carrying wires. The voltage sense wire does not have current passing through it and as such, does not generate any parasitic resistance.

In the four-wire implementation, two wires are connected to two respective ends of the RTD sensor and provide current to the RTD sensor. Two additional voltage sense wires are also connected to the two respective ends of the RTD sensor. The two voltage sense wires do not have current passing through them and as such the voltage measured by the two voltage sense wires does not include parasitic resistances.

SUMMARY

A thermocouple temperature sensor has a thermocouple with first and second conductors connected at a junction and a resistance temperature device with first and second conductors. The first conductor of the resistance temperature device is connected to the first conductor of the thermocouple. A first external conductor is connected to the second conductor of the thermocouple, wherein the first external conductor is configured as a voltage sense conductor for the resistance temperature device and a voltage sense conductor for the thermocouple. A second external conductor is connected to the first conductors of the thermocouple and the resistance temperature device, wherein the second external conductor is configured as a current conductor for the resistance temperature device and a voltage sense conductor for the thermocouple. A third external conductor is connected to the second conductor of the resistance temperature device and is configured as a current conductor for the resistance temperature device.

In a further embodiment, a thermocouple capsule includes an exterior sheath with a resistance temperature device and a thermocouple positioned in the sheath. An external conductor of the thermocouple capsule is configured to both conduct current that passes through the resistance temperature device and to communicate a voltage from the thermocouple.

In a still further embodiment, a method of measuring a temperature of a thermocouple positioned in a process fluid is provided. The method includes passing a current through a resistance temperature device using a first conductor and a second conductor and measuring a voltage across a thermocouple using the second conductor and a third conductor. A reference temperature is determined based on a voltage produced by the resistance temperature device in response to the current and the reference temperature and the voltage across the thermocouple are used to determine a temperature of the thermocouple.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION OF ILLUSTRATIVE EMBODIMENTS

Using a thermocouple with a remotely mounted temperature transmitter can be expensive when it requires precious metal thermocouple extension wires. In particular, because the temperature transmitter includes an internal temperature sensor to sense the temperature of the free ends of the thermocouple conductors, those free ends must be located within the temperature transmitter. As such, the thermocouple conductors in a remote mount configuration must extend from the temperature transmitter to the process conduit that the temperature sensor is mounted on. Since the metals for the thermocouple are more expensive than copper, the resulting extension cables required to run from the temperature sensor to the remotely-mounted temperature transmitter are more expensive and require a specialized installation. In addition, because the thermocouple cables are only required for use with thermocouple temperature sensors, if an RTD sensor is replaced with a thermocouple temperature sensor, the existing copper cables for the RTD sensor must also be replaced requiring more labor than if just the temperature sensor had to be replaced.

The present embodiments provide a thermocouple temperature sensor that does not require specialized extension cables for remote-mount temperature transmitters. The temperature sensor of the present embodiment includes a sheath or capsule that houses both a thermocouple having a junction designed to be put within a process conduit and an RTD sensor designed to be outside of the process conduit. The free ends of the thermocouple are placed outside of the process conduit and one of the thermocouple conductors is connected to the RTD sensor. Three external conductors then extend out from the temperature sensor capsule with one conductor connected to a free end of one of the thermocouple conductors, a second external conductor connected to the other thermocouple conductor and the RTD sensor and the third conductor connected to the other end of the RTD sensor. In some embodiments, a fourth external conductor is connected to the end of the RTD sensor opposite the thermocouple. Using these external conductors, the temperature transmitter can determine the resistance of the RTD sensor and can therefore remotely determine the reference temperature of the free ends of the thermocouple within the sheath of the temperature sensor. The temperature transmitter can then use this reference temperature and the voltage provided by the thermocouple, as measured using the external conductors from the temperature sensor, to determine the temperature at the junction of the thermocouple within the process conduit.

Figure 1:
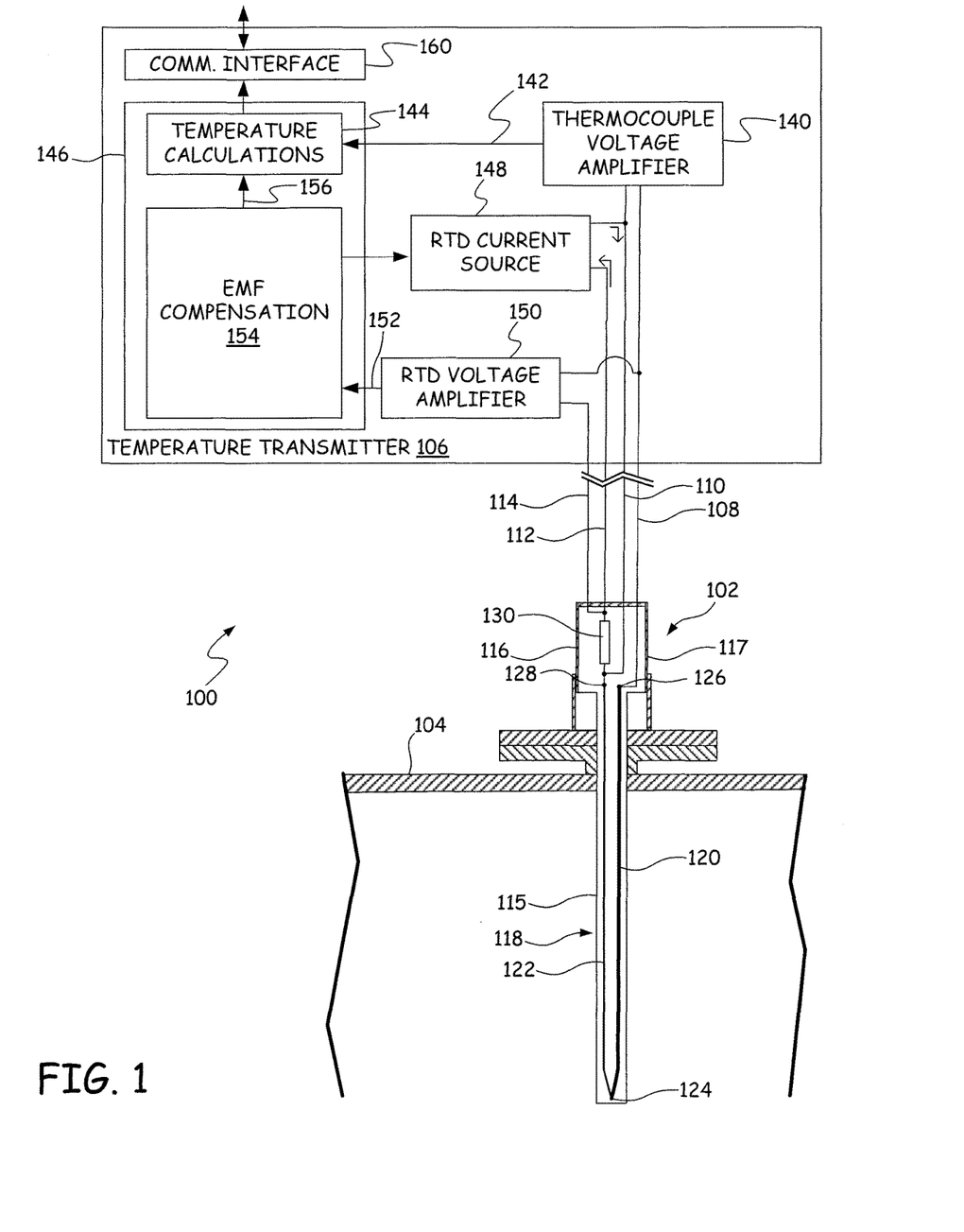
FIG. 1 is a plan view of a remote mount temperature measurement system using a four-wire configuration in accordance with one embodiment.

FIG. 1 provides a plan view of a remote temperature measurement system 100 in accordance with one embodiment, with some elements shown in cross-section. System 100 includes a temperature sensor capsule 102 mounted to a process conduit 104 and connected remotely to a temperature transmitter 106 by four external conductors 108, 110, 112 and 114. External conductors 108, 110, 112 and 114 are copper wires that have a length greater than 1 foot to allow remote mounting of temperature transmitter 106 relative to temperature sensor capsule 102. Temperature sensor capsule 102 includes an outer sheath 116 with a first portion or end 115 and a second portion or end 117. First portion 115 is designed to be placed within the environment inside process conduit 104 so as to be exposed to the temperature in process conduit 104. Second portion 117 is designed to be placed in the environment outside of process conduit 104 so as to be exposed to the temperature outside of process conduit 104. Second portion 117 is depicted as having a larger radius than first portion 115 in order to make it easier to view the connections in the various embodiments. In most embodiments, however, second portion 117 and first portion 115 will have a same radius such that outer sheath 116 has a constant radius along its length.

Outer sheath 116 houses a thermocouple 118 consisting of a first metal conductor 120 and a second metal conductor 122 that are joined at a "hot" junction 124 and that have two respective free ends 126 and 128. Hot junction 124 is designed to be located within first portion 115 of outer sheath 116 so as to be exposed to the heat within process conduit 104. Free ends 126 and 128 are designed to be in second portion 117 of outer sheath 116 so as to be exposed to the heat outside of process conduit 104. Second portion 117 of sheath 116 also includes RTD sensor 130 so that RTD sensor 130 is exposed to the heat outside of process conduit 104.

In the embodiment shown in FIG. 1, the free end 126 of thermocouple conductor 120 is connected to external conductor 108 and the free end 128 of thermocouple conductor 122 is connected to one end of RTD sensor 130 and to external conductor 110. The other end of RTD sensor 130 is connected external conductors 112 and 114.

External conductors 108 and 110 are electrically coupled to thermocouple voltage amplifier 140 in temperature transmitter 106. Thermocouple voltage amplifier 140 amplifies the voltage between free ends 126 and 128 of thermocouple 118 to provide a thermocouple voltage 142 to a set of temperature calculations 144 executed by a digital processor 146 in temperature transmitter 106.

An RTD current source 148 applies a current to RTD sensor 130 through external conductors 110 and 112. Thus, external conductor 110 acts both as a thermocouple voltage sense conductor and as a current conductor for the RTD. External conductor 112 also acts as a current conductor for the RTD.

External conductors 108 and 114 are electrically coupled to an RTD voltage amplifier 150, which amplifies a voltage between the two conductors to provide an RTD voltage 152 to an EMF compensation unit 154. EMF compensation 154 are instructions executed by digital processor 146 to compensate RTD voltage 152 for baseline EMF that is present between external conductors 108 and 114 when no current is present in RTD sensor 130, as discussed further below. The EMF-compensated RTD voltage 156 is then provided to the temperature calculations 144.

Thus, external conductors 108 and 114 act as voltage sense conductors for RTD sensor 130 and communicate respective voltages to RTD voltage amplifier 150. External conductors 108 and 110 act as voltage sense conductors for thermocouple 118 and communicate respective voltages from free ends 126 and 128 of thermocouple 118 to thermocouple voltage amplifier 140. External conductors 110 and 112 act as current conductors for RTD sensor 130 and conduct current through RTD sensor 130. As such, external conductors 108 and 110 are each performing two functions. External conductor 108 acts as a voltage sense conductor for both thermocouple 118 and for RTD sensor 130. External conductor 110 acts as a voltage sense conductor for thermocouple 118 and as a current conductor for RTD sensor 130. Thus, external conductor 110 acts to both conduct current through RTD sensor 130 and to communicate a voltage from thermocouple 118 to thermocouple voltage amplifier 140. By using external conductors 108 and 110 for multiple purposes, the total number of conductors needed between temperature sensor capsule 102 and temperature transmitter 106 is reduced.

The EMF-compensated RTD voltage 156 is used by temperature calculations 144 to determine a reference temperature for free ends 128 and 126 of thermocouple 118. In particular, the temperature can be determine by calculating the resistance of RTD sensor 130 based on the current applied by RTD current source 148 and the EMF-compensated RTD voltage 156 and then applying the measured resistance to a resistance-versus-temperature curve, which can be stored as an equation or as a set of table entries within temperature transmitter 106. To ensure that the reference temperature determined from RTD sensor 130 accurately reflects the temperature of free ends 126 and 128, RTD sensor 130 and free ends 126 and 128 should be in close thermal proximity with each other.

Once the reference temperature has been determined, temperature calculations 144 use the reference temperature and the thermocouple voltage 142 to calculate the temperature at hot junction 124. In particular, the reference temperature is applied to a characteristic function to generate a value for the characteristic function at the reference temperature and this value is added to the voltage to produce a value for the characteristic function at the sensed temperature of hot junction 124. This value for the characteristic function is then used to retrieve the sensed temperature from a table that correlates sensed temperatures to values of the characteristic function for thermocouple 118. The resulting sensed temperature is then provided to a communication interface 160, which communicates with a control room or other process devices using wired or wireless communication, such as a two-wire process control loop.

Because external voltage sense conductors 114 and 108 sense a voltage across both RTD sensor 130 and thermocouple 118, the voltage provided to RTD voltage amplifier 150 includes not only the voltage across RTD sensor 130 but also the voltage generated by thermocouple 118. If the thermocouple voltage is not removed from RTD voltage 152, the reference temperature calculated from RTD voltage 152 will be in error. EMF compensation 154 executed by digital processor 146 identifies and removes the thermocouple voltage from RTD voltage 152. In one embodiment, EMF compensation 154 determines the thermocouple voltage by turning RTD current source 148 off. When RTD current source 148 is off, the voltage between external voltage sense conductors 108 and 114 consists of the thermocouple voltage due to the temperature gradient and other stray EMF in the circuit. This voltage is then stored by EMF compensation 154 and when the RTD current source 148 is turned back on, the stored voltage is subtracted from the RTD voltage 152 to produce the EMF-compensated RTD voltage.

In an alternative embodiment, EMF compensation unit 154 alters the direction of the current produced by RTD current source 148 to produce two different RTD voltage readings, one reading with the current in a first direction and another reading with the current in a second direction. Subtracting these two voltage readings and dividing by two removes the thermocouple voltage due to the temperature gradient and other stray EMF in the circuit and provides the voltage across RTD 130, which EMF compensation 154 then outputs as the EMF-compensated RTD voltage 156.

Figure 2:
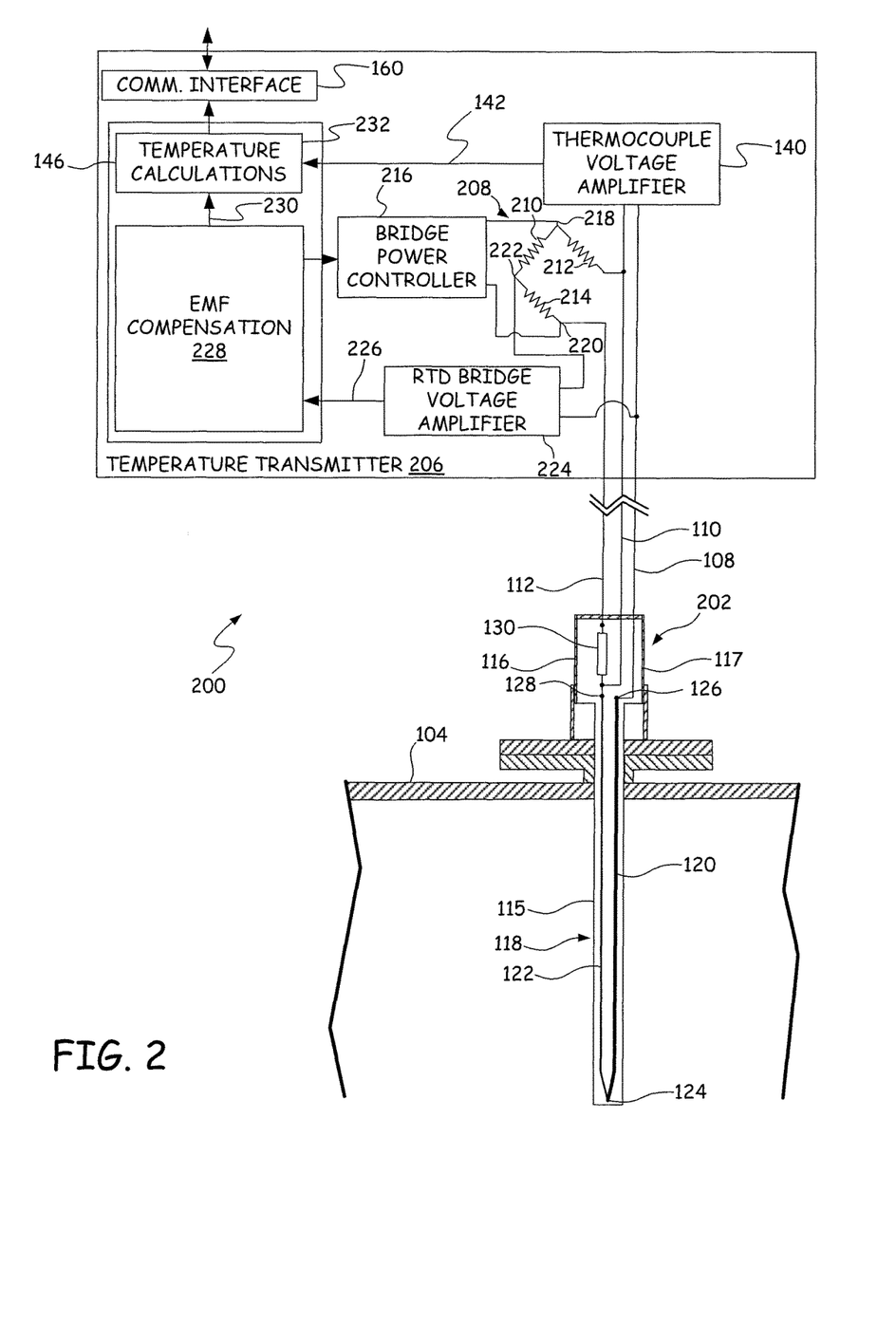
FIG. 2 is a plan view of a remote mount temperature sensing system using a three-wire configuration.

FIG. 2 provides a plan view of another embodiment of a temperature sensing system 200 that includes a temperature transmitter 206 and a temperature sensor capsule 202. Temperature sensor capsule 202 is identical to temperature sensor capsule 102 with the exception that external voltage sense conductor 114 is not present in temperature sensor capsule 202.

In temperature transmitter 206, thermocouple voltage amplifier 140 continues to be electrically coupled to external thermocouple voltage sense conductors 108 and 110 and provides an amplified thermocouple voltage 142 based on the voltage between conductors 108 and 110. Thus, the determination of the thermocouple voltage is the same in temperature transmitter 206 as in temperature transmitter 106.

Temperature transmitter 206 also includes a bridge circuit 208 consisting of three resistors 210, 212 and 214. A bridge power controller 216 controls the power applied across bridge circuit 208. In particular, bridge power controller 216 applies a first voltage at a node 218 between resistors 212 and 210 and a second voltage at a node 220 between resistor 214 and external conductor 112. The other end of resistor 212, opposite node 218 is connected to external conductor 110. As a result, when a positive voltage is applied between node 218 and node 220, external conductor 110 carries a current that passes through RTD sensor 130 and is returned on external conductor 112. This current generates a voltage across RTD sensor 130.

By measuring the voltage across bridge circuit 208 between a node 222 at the junction of resistors 210 and 214 and external conductor 108, it is possible to remove the effects of the line resistances of external conductors 110 and 112 on the measured resistance of RTD sensor 130. In particular, since no current is passing through external conductor 108, the voltage provided by external conductor 108 is not affected by the resistance of external conductor 108 and the resistances of external conductors 110 and 112 are balanced out by bridge circuit 208.

Thus, in the embodiment shown in FIG. 2, external conductor 108 acts as a voltage sense conductor for both thermocouple 118 and RTD sensor 130 by communicating a voltage to both thermocouple voltage amplifier 140 and RTD bridge voltage amplifier 224. External conductor 110 acts as a voltage sense conductor for thermocouple 118 by communicating a voltage from free end 128 of thermocouple 118 to thermocouple voltage amplifier 140. External conductor 110 also acts as a current conductor for RTD sensor 130 by conducting a current that passes through RTD sensor 130. Lastly, external conductor 112 acts as a current conductor for RTD sensor 130 by also conducting the current that passes through RTD sensor 130. By having external conductors 108 and 110 perform two different functions, the embodiment of FIG. 2 reduces the number of conductors that must be connected to temperature sensor capsule 202.

The voltage between node 222 and conductor 108 is applied to an RTD bridge voltage amplifier 224. RTD bridge voltage amplifier 224 generates an amplified voltage 226 that is provided to EMF compensation 228. EMF compensation 228 executes on digital processor 146 and alters amplified voltage 226 to remove the thermocouple voltage of thermocouple 118 and other stray EMF on conductor 108. EMF compensation 228 then provides a compensated voltage 230 to temperature calculations 232. Temperature calculations 232, which are executed by digital processor 146, first determines a resistance value for RTD sensor 130 based on compensated voltage 230, the architecture of bridge circuit 208 and the power provided to bridge circuit 208 by bridge power controller 216. Temperature calculations 232 then determine a reference temperature based on the resistance of RTD sensor 130 where the reference temperature represents the temperature of free ends 128 and 126 of thermocouple 118. As noted above, this reference temperature can be determined by using a resistance-versus-temperature curve for RTD sensor 130 or by examining a table of temperature values for resistance values of RTD sensor 130.

Once the reference temperature has been determined, temperature calculations 232 use the reference temperature and thermocouple voltage 142 to determine the temperature at hot junction 124. In particular, as discussed above, the reference temperature can be applied to a characteristic function and the resulting value can be added to the thermocouple voltage to generate a value for the characteristic function at the temperature of hot junction 124. That value can then be applied to a table to identify the corresponding temperature at hot junction 124. The temperature of hot junction 124 is then provided to communication interface 160, which transmits the temperature to a control room or to one or more other process devices using a wireless or wired connection such as a two-wire process control loop.

In the embodiments of FIGS. 1 and 2, the external conductors take the form of copper wires that extend from temperature sensor capsules 102 and 202 to a distance that is greater than 1 foot to allow temperature transmitters 106 and 206 to be remotely mounted relative to temperature sensor capsules 102 and 202.

Figure 3:
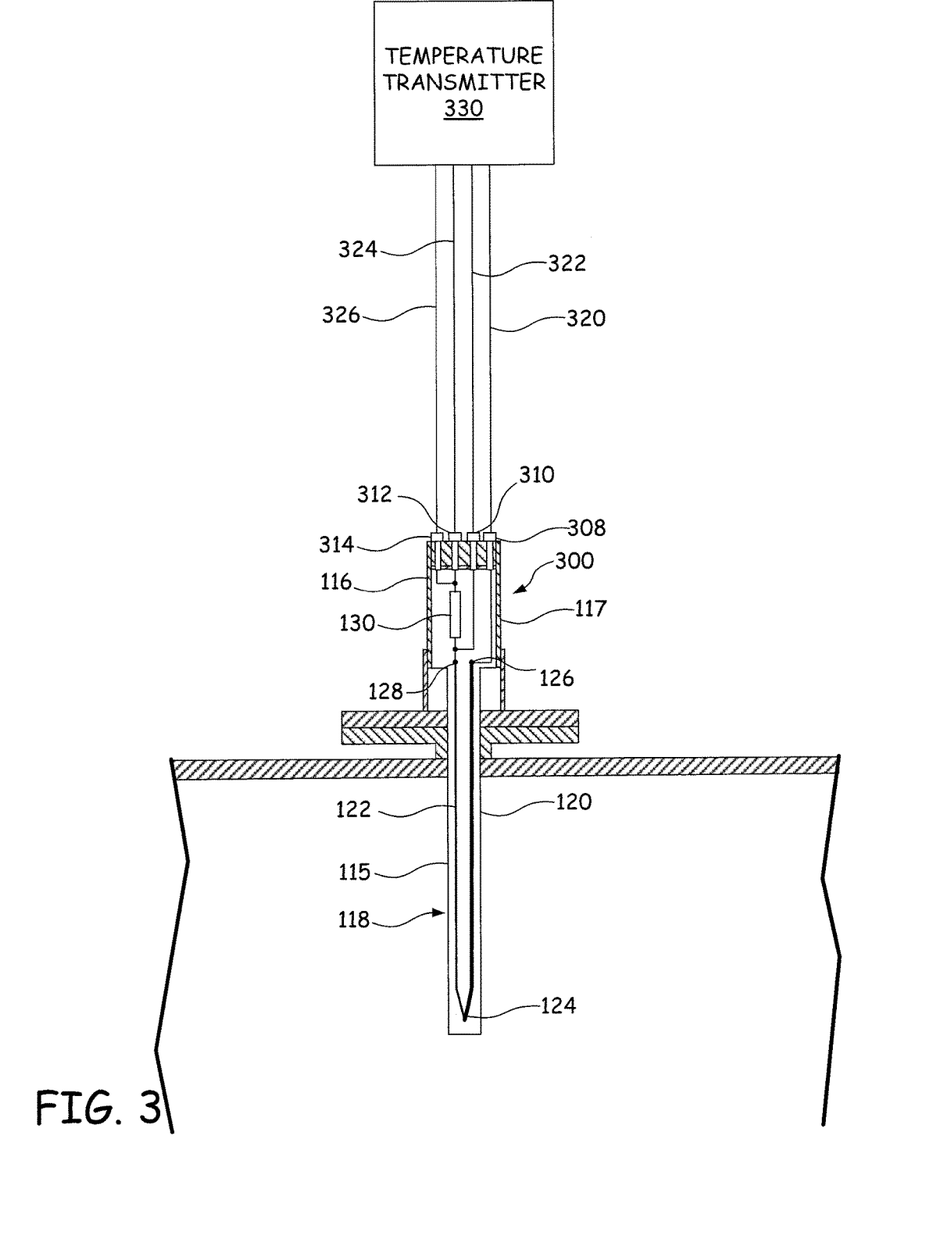
FIG. 3 is a sectional view of an alternative embodiment of a temperature sensor capsule.

FIG. 3 provides an alternative embodiment in which a temperature sensor capsule 300 has four external conductors 308, 310, 312 and 314 that take the form of terminals to which copper connecting wires 320, 322, 324 and 326 may be connected. Copper connecting wires 320, 322, 324 and 326 extend to the temperature transmitter 330 that is remotely mounted from temperature sensor capsule 300. Temperature sensor capsule 300 is identical to temperature sensor capsule 102 of FIG. 1 with the exception that external conductors 108, 110, 112 and 114 have been replaced with external conductors 308, 310, 312 and 314, respectively. Thus, external conductor 308 is connected to free end 126 of thermocouple conductor 120, external conductor 310 is connected to free end 128 of thermocouple conductor 122 and to RTD sensor 130 and external conductors 312 and 314 are connected to the other end of RTD sensor 130. Note that in FIG. 3, external conductor 314 and copper connecting wire 326 are optional and may be removed to implement a three-wire sensing embodiment as discussed in FIG. 2.

Figure 4:
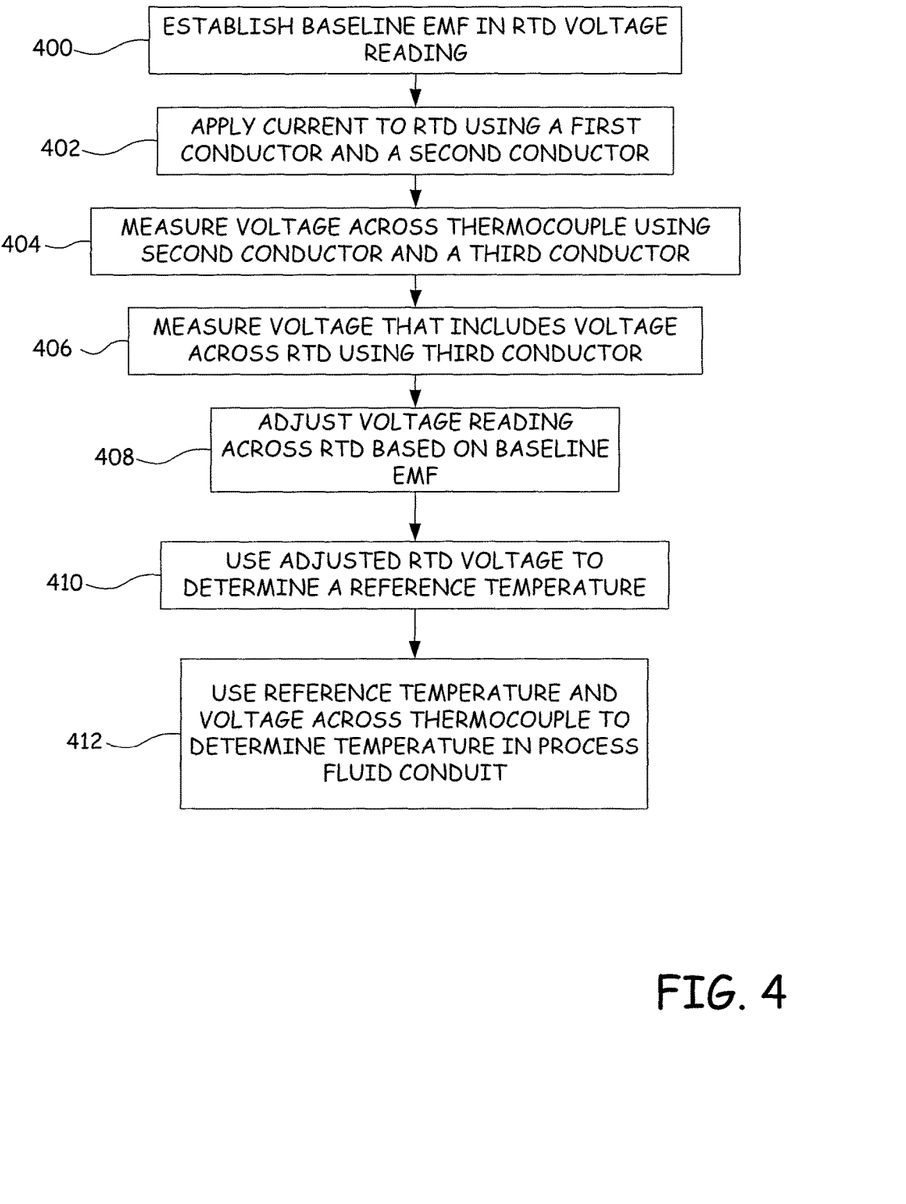
FIG. 4 is a flow diagram of a method of measuring temperature in accordance with one embodiment.

FIG. 4 provides a flow diagram of a method of determining a temperature at a thermocouple junction. In step 400, a baseline EMF in the RTD voltage reading is established. This can be accomplished by turning off RTD current source 148 or by applying zero voltage at the output of bridge power controller 216 and then measuring the voltage across RTD sensor 130 using the external RTD voltage sense conductors. The sensed voltage is then the baseline EMF in the RTD voltage reading. Alternatively, the baseline EMF can be determined by setting RTD current source 148 to apply a current in a first direction and measuring a first RTD voltage and then setting RTD current source 148 to set a current in an opposite direction and measuring a second voltage. The two voltages can be added together and divided by 2 to identify the baseline EMF. For the embodiment of FIG. 2, the baseline EMF can be determined by applying a first voltage at the output of bridge power controller 216 and measuring a first RTD bridge voltage and then applying a negative voltage at the output of bridge power controller 216 and measuring a second RTD bridge voltage. These two bridge voltages can be added together and divided by 2 to arrive at the baseline EMF.

After the baseline EMF has been determined at step 400, a current is applied to the RTD sensor using a first conductor and a second conductor at step 402. A voltage across the thermocouple is then measured using the second conductor and a third conductor at step 404 and a voltage that is formed at least in part by the voltage across the RTD is measured using the third conductor alone or using the third conductor with either the first conductor or a fourth conductor at step 406. The voltage reading that is based at least in part on the voltage across the RTD is then adjusted based on the baseline EMF at step 408 and the adjusted RTD voltage is used to determine a reference temperature at step 410. The reference temperature and voltage across the thermocouple are then used to determine the temperature in the process fluid conduit at step 412.

Although the present invention has been described with reference to preferred embodiments, workers skilled in the art will recognize that changes may be made in form and detail without departing from the spirit and scope of the invention.

What is claimed is:

1. A thermocouple temperature sensor comprising:
    a thermocouple having first and second conductors connected at a junction;
    a resistance temperature device having a first conductor and a second conductor, the first conductor of the resistance temperature device connected to the first conductor of the thermocouple;
    a first external conductor connected to the second conductor of the thermocouple, wherein the first external conductor is configured as a voltage sense conductor for the resistance temperature device and a voltage sense conductor for the thermocouple;
    a second external conductor connected to the first conductors of the thermocouple and the resistance temperature device, wherein the second external conductor is configured as a current conductor for the resistance temperature device while configured as a voltage sense conductor for the thermocouple; and
    a third external conductor connected to the second conductor of the resistance temperature device, wherein the third external conductor is configured as a current conductor for the resistance temperature device.

2. The thermocouple temperature sensor of claim 1 further comprising a fourth external conductor connected to the second conductor of the resistance temperature device, wherein the fourth external conductor is configured as a voltage sense conductor for the resistance temperature device.

3. The thermocouple temperature sensor of claim 1 wherein the third external conductor is further configured as a voltage sense conductor for the resistance temperature device.

4. The thermocouple temperature sensor of claim 1 further comprising an external sheath such that the thermocouple and the resistance temperature device are both within the external sheath.

5. The thermocouple temperature sensor of claim 4 wherein the thermocouple is located within a portion of the external sheath that is configured to be placed in a first environment at a first temperature and the resistance temperature device is located in a second portion of the external sheath that is configured to be placed in a second environment at a second temperature.

6. The thermocouple temperature sensor of claim 1 wherein the first external conductor, the second external conductor and the third external conductor each comprise copper wires.

7. The thermocouple temperature sensor of claim 6 wherein the copper wires of the first external conductor, the second external conductor and the third external conductor are each longer than one foot.

8. The thermocouple temperature sensor of claim 1 wherein the first external conductor, the second external conductor and the third external conductor comprise terminals configured to be coupled to wires.

9. The thermocouple temperature sensor of claim 1 further comprising a transmitter connected to the thermocouple temperature sensor.

10. The thermocouple temperature sensor of claim 9 wherein the transmitter comprises EMF compensation.

11. A thermocouple capsule comprising:
an exterior sheath;
a resistance temperature device positioned in the sheath and having a first conductor and a second conductor;
a thermocouple positioned in the sheath and having a first conductor and a second conductor connected together at a junction, wherein the first conductor and the second conductor of the thermocouple have respective free ends apart from the junction and wherein the first conductor of the resistance temperature device is connected to the first conductor of the thermocouple at the free end of the first conductor of the thermocouple;
a first external conductor that is configured to both conduct current that passes through the first conductor of the resistance temperature device and to communicate a voltage from the first conductor of the thermocouple;
a second external conductor that is configured to communicate a voltage from the second conductor of the thermocouple;
a third external conductor that is configured to conduct a current that passes through the second conductor of the resistance temperature device; and
a fourth external conductor that is configured to communicate a voltage from the second conductor of the resistance temperature device.

12. The thermocouple capsule of claim 11 wherein the external conductor comprises a copper wire that is greater than one foot long.

13. The thermocouple capsule of claim 11 wherein the external conductor comprises a terminal.

14. The thermocouple capsule of claim 11 wherein the resistance temperature device is positioned in a first end of the exterior sheath and the junction of the thermocouple is positioned in a second end of the exterior sheath.

15. A method of measuring a temperature of a thermocouple positioned in a process fluid:
passing a current through a resistance temperature device using a first conductor and a second conductor;
measuring a voltage across a thermocouple using the second conductor and a third conductor;
determining a voltage produced by the resistance temperature device in response to the current using the third conductor;
determining a reference temperature based on the voltage produced by the resistance temperature device in response to the current;
using the reference temperature and the voltage across the thermocouple to determine a temperature of the thermocouple.

16. The method of claim 15 wherein determining the voltage produced by the resistance temperature device in response to the current further comprises using the first conductor.

17. The method of claim 15 wherein determining the voltage produced by the resistance temperature device in response to the current further comprises using a fourth conductor that is electrically coupled to the resistance temperature device.

18. The method of claim 15 wherein the resistance temperature device and the thermocouple are in a single sheath.

19. The method of claim 18 wherein a portion of the sheath containing the thermocouple is located in a conduit containing the process fluid and a portion of the sheath containing the resistance temperature device is located outside of the conduit.

* * * * *